United States Patent
Gabrys

(10) Patent No.: US 7,508,157 B1
(45) Date of Patent: Mar. 24, 2009

(54) LINE SYNCHRONOUS AIR CORE MOTOR

(76) Inventor: Christopher W. Gabrys, 1001 S. Meadows Pkwy., #1126, Reno, NV (US) 89521

( * ) Notice: Subject to any disclaimer, the term of this patent is extended or adjusted under 35 U.S.C. 154(b) by 0 days.

(21) Appl. No.: 11/334,860

(22) Filed: Jan. 18, 2006

Related U.S. Application Data

(60) Provisional application No. 60/644,596, filed on Jan. 18, 2005.

(51) Int. Cl.
*H02P 1/46* (2006.01)
(52) U.S. Cl. .................. 318/716; 318/712; 318/254; 318/138; 318/439
(58) Field of Classification Search .............. 318/700, 318/712, 716, 254, 138, 439
See application file for complete search history.

(56) References Cited

U.S. PATENT DOCUMENTS

| | | | | |
|---|---|---|---|---|
| 3,671,962 A | * | 6/1972 | Fales ..................... | 340/815.64 |
| 4,275,343 A | * | 6/1981 | Fulton et al. ............ | 318/721 |
| 4,371,823 A | | 2/1983 | Lohest ................... | 318/705 |
| 4,405,873 A | | 9/1983 | Nondahl ................. | 310/156 |
| 4,506,181 A | | 3/1985 | Jones et al. ............. | 310/156 |
| 4,742,258 A | * | 5/1988 | Earle et al. ............. | 310/156.53 |
| 4,795,936 A | * | 1/1989 | Crosetto et al. ......... | 310/156.53 |
| 4,868,479 A | * | 9/1989 | Byong-Ho et al. ........ | 318/721 |
| 5,187,401 A | | 2/1993 | Rahman ................. | 310/156 |
| 5,723,933 A | | 3/1998 | Grundl .................. | 310/266 |
| 5,744,896 A | | 4/1998 | Kessinger, Jr. ........... | 310/268 |
| 5,751,131 A | * | 5/1998 | Sears et al. ............. | 318/778 |
| 5,831,367 A | | 11/1998 | Fei et al. ............... | 310/217 |
| 5,886,505 A | | 3/1999 | Giberson ................ | 322/100 |
| 6,707,216 B2 | | 3/2004 | Han et al. .............. | 310/211 |
| 6,891,308 B2 | * | 5/2005 | Shoykhet ............... | 310/260 |

* cited by examiner

*Primary Examiner*—Rita Leykin
(74) *Attorney, Agent, or Firm*—J. Michael Neary

(57) ABSTRACT

A motor system includes an air core motor having a rotor with opposed permanent magnet poles defining therebetween a magnetic airgap and driving magnetic flux across the magnetic airgap. A stationary armature with air core windings is located within the magnetic airgap. The permanent magnet poles produce a magnetic flux density through the air core windings to produce a back emf in the windings comparable to the voltage of the line power when the rotation of the permanent magnet poles is synchronous with the line power. A electronic variable speed drive coupled by a switch to the air core windings ramps up the frequency of power to the air core windings for accelerating the rotor to near line synchronous speed. When the frequency of the back emf approaches the frequency of the line power, the switch decouples the electronic variable speed drive and couples the air core windings to the line power for synchronous operation.

20 Claims, 7 Drawing Sheets

LINE SYNCHRONOUS AIR CORE MOTOR

This is related to U.S. Provisional Application No. 60/644,596 entitled "Slotless Motor-Generators" and filed on Jan. 18, 2005.

This invention pertains to brushless motors more particularly to a motor system that provides increased operating efficiency for fixed speed motor applications.

BACKGROUND OF THE INVENTION

There is a great desire to increase the efficiency of electrical motors for saving energy and money. In industrialized countries, electric motors consume over 50% of electricity production. In the U.S., an increase in motor efficiency of only 1% would result in an electrical energy cost savings of over $1 B annually.

One way to increase the efficiency of electrical motors is to change their design and construction to reduce energy losses. Air core motors, which locate the windings within a magnetic airgap instead of within slots in a steel stator, can increase efficiency by reducing or eliminating magnetically induced losses. But despite the increased efficiency of air core motors over conventional motors, in many applications, especially fixed speed applications, the efficiency improvement is not as high as desired.

Although air core motors can provide higher efficiency than conventional induction motors, with our dynamometer test results to date approaching 99.0% efficiency, they require a variable speed drive (VSD) to operate. The VSD is required for operation of air core motors because they are synchronous machines. VSD efficiency is typically between 92–96% efficient, thereby unfortunately reducing significantly the total possible efficiency of the motor system. In addition, air core motors also have a much lower armature winding inductance, up to 1000 times lower. This low inductance, in many cases, requires the addition of inductors to reduce the occurrence of harmonic causing ripple currents caused by the high frequency switching regulation of the VSD. These inductors add additional losses to the motor system. Although the air core motor with VSD provides a much higher efficiency than a comparable induction motor with VSD for variable speed applications, the efficiency advantage is not as significant as desirable when comparing against an induction motor running directly from line power for fixed speed applications.

Unlike conventional slot wound synchronous motors, air core motors also cannot line start. Conventional slot wound synchronous motors can forego the use of a VSD and can line start by utilizing an Amortisseur winding on the rotor that allows asynchronous starting and operation up to synchronization speed. In contrast, air core motors inherently utilize a much larger, as much as 30 times larger, magnetic airgap for the locating of the armature windings. The location of the windings in the large airgap provides the desired efficiency increase. However, the large magnetic airgap also results in the field flux being generated almost exclusively by permanent magnets on the rotor that drive the flux across the armature airgap. As a result, the armature windings do not generate a significant external magnetic field to excite an Amortisseur winding, if it were included on the rotor. An additional problem of conventional air core motor systems is the high pole count for increasing the efficiency and reducing motor size and costs, which would result in an operating speed, if it could be operated line synchronously, that is much too low, i.e. only 300 rpm for typical 24 pole air core motor. This low speed makes it both incompatible for typical motor applications and it also substantially reduces the power output capability for a given motor size and cost, making it uncompetitive.

Despite the increased efficiency of air core motors over conventional motors, in many applications, especially fixed speed applications, the efficiency improvement is not as high as desired. A new motor system for providing further increased efficiency is needed. Thus, there has long been a need for a new motor system for providing further increased efficiency.

SUMMARY OF THE INVENTION

The invention provides a motor system that overcomes these obstacles and deficiencies and produces exceedingly high operating efficiency for use in fixed speed motor applications. A total motor system efficiency of as high as 99.0% efficiency is achievable, which is significantly higher than conventional induction motors, regardless of their size. The motor system provides a substantial energy cost savings that is particularly desirable for high duty cycle motor applications, such as but not limited to fans and blowers, compressors, pumps, manufacturing equipment and transportation.

The invention provides a motor system for converting electrical energy from line power into rotational mechanical energy. The motor system comprises an air core motor, an electronic variable speed drive, a detector or controller, and a switch to cut out the VSD and couple the air core windings to line power when the detector or controller recognizes that the motor has reached or is approaching synchronous speed. The air core motor is comprised of a rotor with permanent magnet poles and a stationary armature with air core windings located within a magnetic airgap. The permanent magnet poles are set to produce a level of magnetic flux density through the air core windings in the magnetic airgap such that a back emf is produced in the windings that is comparable to the voltage of the line power when the rotation of the permanent magnet poles across the air core windings is synchronous with the line power. The electronic variable speed drive couples to the windings and accelerates the rotor to near line synchronous speed by ramping up the frequency of power to the air core windings. The switch then couples the air core windings to the line power when the frequency of the back emf approaches the frequency of the line power.

In addition to the back emf being comparable to line power, the air core motor is also specially designed to have a lower pole number to provide line synchronous operation at the desirable speeds. The air core motor further has a set number of poles, n, the line power has a frequency, f in Hz, and the motor has an operating rotational speed, R in rpm, such that: n=120 f/R.

The electronic variable speed drive converts line power to a lower frequency drive power that is supplied to the windings, and the electronic variable speed drive ramps up the frequency of the drive power to accelerate the rotor. The switch couples the line power to the windings after the electronic variable speed drive accelerates the rotor. The result is that the air core motor is operated directly from line power and the motor system provides the highest efficiency. The air core motor is accelerated to synchronous speed and then the drive losses are eliminated for normal fixed full speed operation. The overall efficiency improvement is as much as 5% over a high pole number, air core motor operating from a VSD.

Air core motors or slotless motors achieve high efficiency in part by eliminating slot-induced losses. Air core motors can be single rotating construction whereby magnets on the rotor bound one side of the magnetic airgap and the other side is bounded by a stationary laminated steel stator. This provides some improvement in efficiency, however a circumferentially varying rotating flux still passes through a ferromagnetic stator, resulting in some magnetically induced losses. To eliminate these losses for the highest possible efficiency, a more preferred air core construction and a preferred embodiment is the use of a double rotating construction. In this construction, the magnetic airgap is bounded on both sides by rotating surfaces of said rotor. The rotating flux is confined and rotates with the ferromagnetic rotor, eliminating both eddy current and hysteresis losses in the flux path.

In yet an additional embodiment, the efficiency and power capability are maximized in the double rotating construction by both surfaces of the rotor facing the magnetic airgap having permanent magnets for driving magnetic flux across the magnetic airgap. Placement of magnets on both surfaces increases the flux density in the magnetic airgap for a given amount of expensive permanent magnet material. This higher flux density is accounted for in the motor system design so as to maintain a back emf voltage that is comparable with the line power voltage when the motor is operating at line synchronous speed. A comparable back emf is preferably within 20% of the line power voltage and more preferably even closer. Having a back emf that is slightly higher than the line power can be used to provide a motor system with a leading power factor. This can be desirable to increase the power factor of a power consumer by balancing against other lagging power factor loads.

When constructing an air core motor with a low pole count having a useable synchronous speed, the efficiency of the air core motor can become reduced. The reduction in efficiency of the motor is the result of higher resistive losses due to having increased winding end turn lengths. To counteract this loss of efficiency, the air core windings can be wound with specially overlapping end turns. To accomplish this, the air core windings are wound having end turns of a single phase that overlap each other in the direction of the magnetic flux in the magnetic airgap. This winding method can make the air core armature winding more difficult and costly, however high efficiency can be maintained despite the lower pole count. An additional deficiency of the low pole number with air core motors is the required increased rotor steel thickness to conduct the greater magnetic flux circumferentially in the rotor between adjacent alternating poles. The heavier rotor increase the motor weight and costs, however these costs are more than overcome by the electricity cost savings that are achieved with the motor system and elimination of VSD and inductor losses.

The windings efficiency are also preferably further maximized through use of eddy current loss mitigating wires for winding. The air core windings are preferably wound with wire formed from multiple individually insulated conductors that are bunched together and electrically connected in parallel, especially for larger motors. The conductors could alternatively be flat or ribbon wires to provide higher winding density. The motor could also include a rotor damper such as a damper winding to reduce speed oscillations. The drive could be designed to drive only two phases to save costs.

When the line power is 3-phase, the armature windings in the air core motor are also 3-phase. A substantial energy savings can be provided by the motor system in 3-phase applications. However, the motor system can also be utilized for motors operating from single-phase power. Single-phase motors typically have significantly lower efficiency than 3-phase motors, some small sizes as low as 75% efficiency. As a result of the low efficiency, the energy savings provided by the motor system in accordance with this invention for single-phase motor applications is even greater. In yet an additional embodiment of the invention, the air core motor is very uniquely wound having only a one-phase winding. For synchronous operation of the motor system, both the line power and the air core windings have only a single phase.

One problem of single-phase motors is that the direction of rotation is not determinable and unlike an induction motor, a shaded pole winding cannot be included to set the rotational direction. In yet an additional embodiment, a single-phase motor system can provide a reliable starting by utilizing the armature windings and excitation. To accomplish a set rotational direction, the air core motor excites only a portion of the windings during the start up of the air core motor to set the rotational direction of the rotor. If only a portion of the windings is excited followed by whole winding being excited, or vice-versa, the rotor rotation will be set in the particular direction desired. The ramping of the frequency by the VSD will continue the acceleration of the rotor in the same direction until switching to line synchronous operation.

The acceleration of the rotor by the VSD must control both the frequency to maintain synchronism and keep the rotor accelerating and also the power to the air core motor windings to limit the current. The acceleration power to the air core windings can be regulated with pulse modulation switching prior to the air core windings being coupled to the line power. Alternatively, the acceleration power to the air core windings can also be regulated with phase angle switching prior to the air core windings being coupled to the line power.

The reliability and low costs of the motor system are especially important to the commercial competitiveness of the motor system. In one embodiment, the electronic variable speed drive ramps the acceleration power to the air core windings without the use of multiple commutation sensors. The synchronism of the rotor with the VSD power is maintained by utilizing a set ramp rate. This ramp rate is preferably set to be sufficiently slow enough to prevent loss of synchronization between the rotor and the VSD under the greatest starting load conditions. The VSD can also include a customer settable ramp rate to allow optimal tailoring for specific loads.

The motor system provides a cost competitive alternative to conventional induction motors having very substantial energy cost savings when used in fixed speed motor applications. The motor system is applicable for widespread applications and particularly ones that run at a fixed speed or spend a large portion of time at fixed speed and thereby can take advantage of reduced losses. It is contemplated that the motor system could also potentially be applied with slot wound permanent magnet synchronous motors for convention, but not affording the full high efficiency improvement possible as described.

DESCRIPTION OF THE DRAWINGS

The invention and its many features and advantages will become better understood upon reading the detailed description of the preferred embodiments in conjunction with the following drawings, wherein.

DESCRIPTION OF THE PREFERRED EMBODIMENTS

Figure 1:
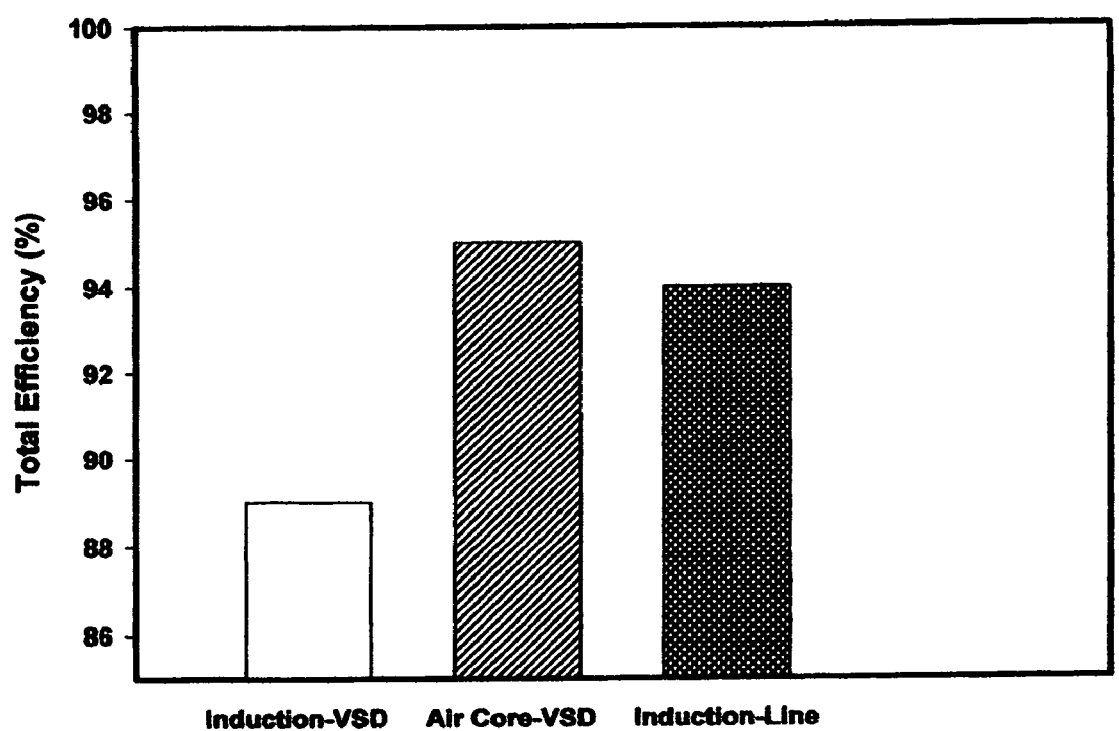
FIG. 1 is a bar graph comparing total efficiency between induction and air core motor systems.

Turning to the drawings, wherein like reference characters designate identical or corresponding parts, FIG. 1 shows a comparison between total efficiency of 40 Hp 1200-rpm induction and air core motor systems. The induction motor is a high efficiency NEMA Premium rating. As shown, the air core motor provides roughly 6% higher efficiency than the induction motor operating from a variable speed drive. The air core motor requires a VSD for operation, which also gives the motor the ability to operate at variable speeds. For variable speed operation, the induction motor is also operated from a VSD. However, not all motor applications require variable speed operation. For a large portion of motor applications, fixed full speed operation is sufficient. For fixed speed applications, the induction motor can be operated without a VSD and is simply coupled to the line power. An air core motor unfortunately cannot be operated by simply coupling it to line power. The efficiency of a fixed speed induction motor without a VSD is much higher than the variable speed induction motor because of the lack of drive losses. The efficiency advantage of the air core motor with VSD over the line powered induction motor is not as large as desirable when used in fixed speed applications, in large part because of the losses incurred in the VSD.

Figure 2:
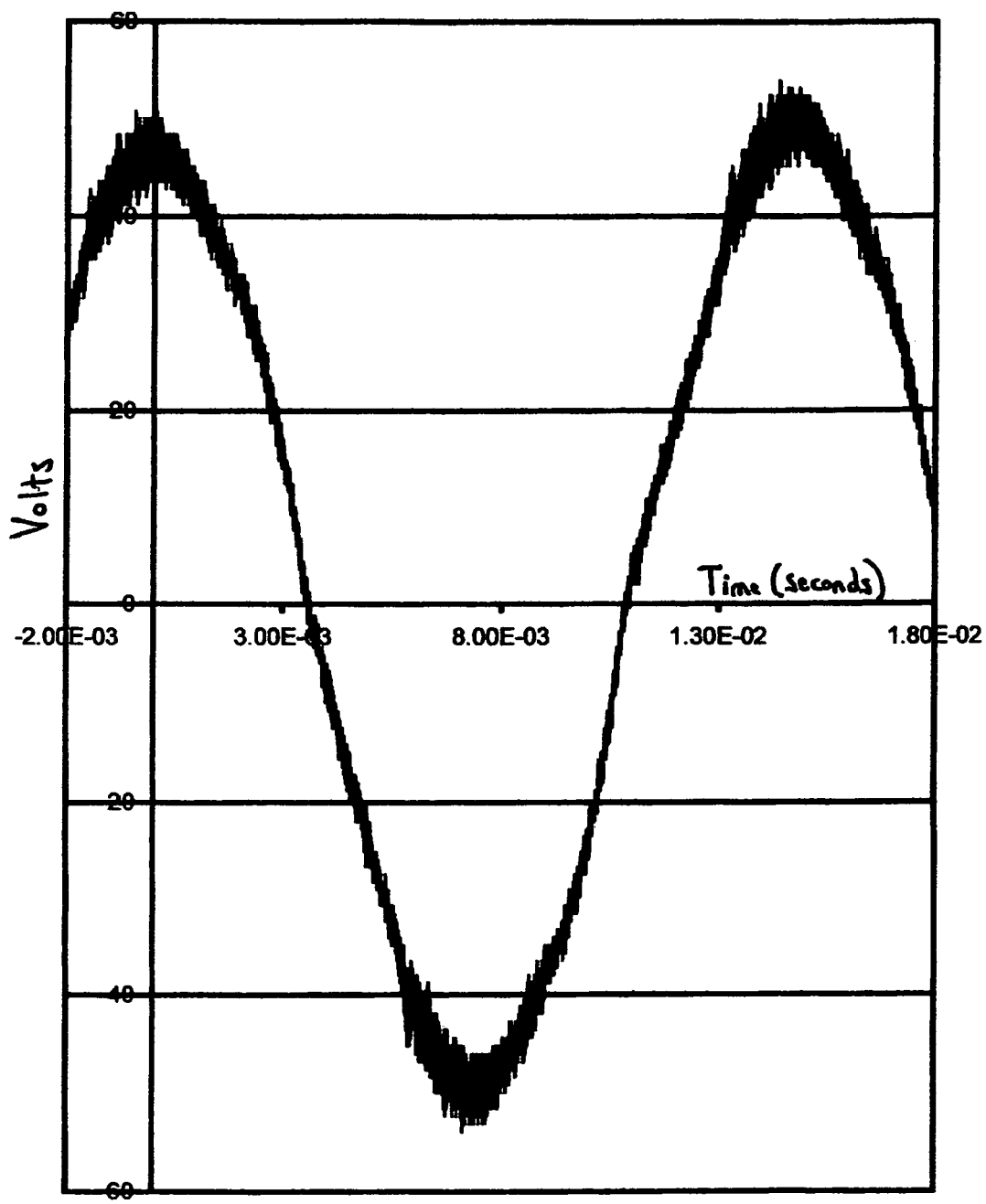
FIG. 2 is a waveform for an air core motor operating from a VSD.

The losses for a motor system with an air core motor operating from a VSD are the result of several factors. A portion of the losses occur from the electronics and switch in the VSD. Another portion of losses in this motor system is in external inductance that must be added between the VSD and air core motor windings. Air core motors are unique in that although they provide higher efficiency by the reduction of internal magnetically induced losses; they have an extremely low internal inductance. The low armature winding inductance results in large pulse modulation ripple current from the VSD to the motor. The ripple current can cause significant harmonic losses. The current waveform for an air core motor operating from a VSD is shown in FIG. 2, illustrating the loss-inducing ripple currents. To reduce these losses to an acceptable level, external inductors are added between the VSD and the armature windings of the air core motor. Unfortunately, these inductors also incur losses, although less than the harmonic losses that would otherwise occur without them. The inductor losses and drive electronics losses and harmonic losses in the motor from the high frequency switching regulation all reduce the operating efficiency of the air core motor-VSD system.

Figure 3:
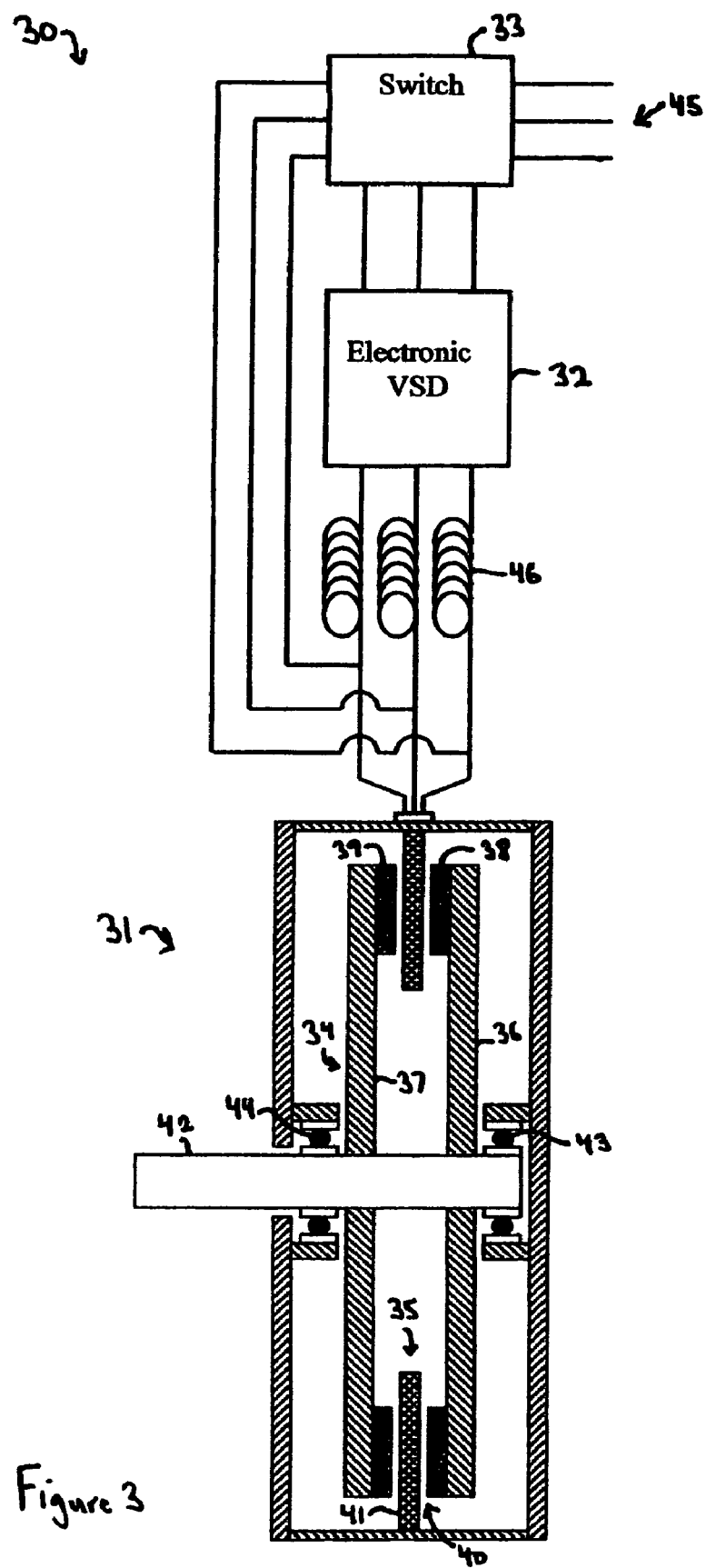
FIG. 3 is a sectional elevation and electrical schematic of an axial gap motor system in accordance with the invention.

A schematic drawing of a motor system 30 that substantially reduces these losses and provides a motor system that is particularly well suited for fixed speed operation with a substantially higher efficiency is shown in FIG. 3. The motor system 30 is comprised of an axial gap air core motor 31, a VSD 32 incorporating a detector or controller that recognizes when the motor has reached or is approaching synchronous speed, and a switch 33. The air core motor 31 is constructed of a rotor 34 and a stator 35. The rotor 34 is comprised of two spaced apart steel discs 36, 37 attached to a shaft 42 that is journaled for rotation in bearings 43, 44. Each disc 36, 37 has circumferential arrays of multiple alternating polarity axially magnetized magnets 38, 39 near the outer diameter. The magnets 38, 39 drive magnetic flux axially across a magnetic airgap 40 that is formed between the two discs 36, 37. The magnetic flux travels circumferentially through the steel discs 36, 37 between alternating polarity magnets 38, 39. Within the magnetic airgap 40 is an air core armature 41 having windings that are excited by magnetic flux from the magnets 38, 39 to induces AC voltage in the windings as the rotor 34 rotates.

In operation of the motor system 30, the VSD 32, powered from line power 45, energizes the windings in the armature 41 to drive the motor rotor 34. Line power 45 is typically power from a utility power line, however any fixed frequency power source connection is possible, such as power from generators. The VSD 32 provides variable frequency drive power to the air core motor 31 and accelerates the motor. The high frequency pulse modulation switching in the electronic variable speed drive is prevented from causing large ripple currents in the air core motor 31 by the addition of added inductors 46. The VSD 32 accelerates the rotor 34 of the air core motor 31 to near synchronous speed with the line power 45. The near synchronous speed is preferably within 10% of the synchronous speed however it only needs to be sufficiently close to synchronous speed to allow for synchronization with line power 45. When the motor speed reaches near synchronous speed, the detector or controller in the VSD recognizes the speed and triggers the switch 33 to couple the line power 45 to the air core windings of the motor 31, and the rotor 34 pulls into synchronization. It can be preferable to time the closure of the switch 33 with the back emf phasing position to facilitate smooth synchronization. Once the switch 33 couples the line power 45 to the air core motor windings, the motor system 30 no longer incurs VSD induced or external inductor losses. An efficiency improvement in the motor system of as much as 5% or more is thereby achieved.

In order for the motor system to operate optimally, the magnet poles 38, 39 are preferably set to produce a level of magnetic flux density through air core windings in magnetic airgap 40 such that a back emf produced in the windings is comparable to the voltage of line power 45 when the rotation of the permanent magnet poles across the air core windings is synchronous with the line power 45. The back emf at synchronous speed is preferably within 20% of the voltage of the line power 45. The comparable back emf provides for a near unity power factor and reduced operating losses. The back emf of the air core motor can be set by the dimensions of the magnets 38, 39 and the thickness of the magnetic airgap 40 as well as the windings of the air core armature 41. In some cases it can be desirable to have comparable but unequal back emf with line power. For instance, setting the back emf at synchronous speed to be greater than the voltage of line power can produce a motor system with a leading power factor, which is sometimes desirable. The back emf of the motor 31 will be affected by the load on the motor and its temperature. Careful design analysis will ensure the most desirable operation.

Figure 4:
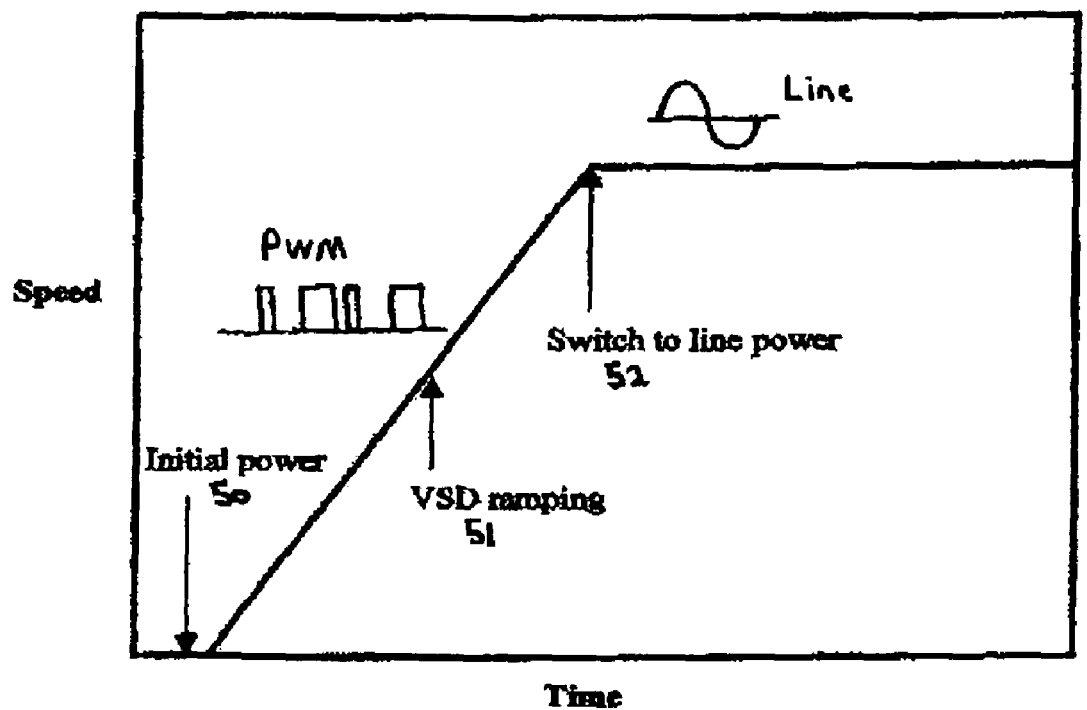
FIG. 4 is an operation plot of a motor system in accordance with the invention.

An operation plot of the motor system 30 is shown in FIG. 4. When the motor is started from zero speed, the VSD can provide initial power 50 to one of the phase windings to pull the rotor into an initial rotational position. The VSD ramping 51 then accelerates the rotor by gradually increasing the frequency to the armature windings. Once near synchronous speed, switching 52 occurs wherein the armature windings are coupled to the line power and the drive losses are eliminated. The VSD can employ conventional multiple commutation sensors for commutation control or can utilize sensorless operation through the induced voltage in the armature windings. However, if the motor system is designed for only fixed speed operation and will only operate at variable speed during start up, it can be desirable to reduce costs of the drive and eliminate commutation feedback. In this case, the ramping of the VSD can be a set acceleration rate that is slow enough and ensures maintaining acceleration synchronism even under the heaviest starting load. The VSD can control the acceleration power by pulse modulation switching or phase angle switching prior to switching to line synchronous operation.

Figure 5:
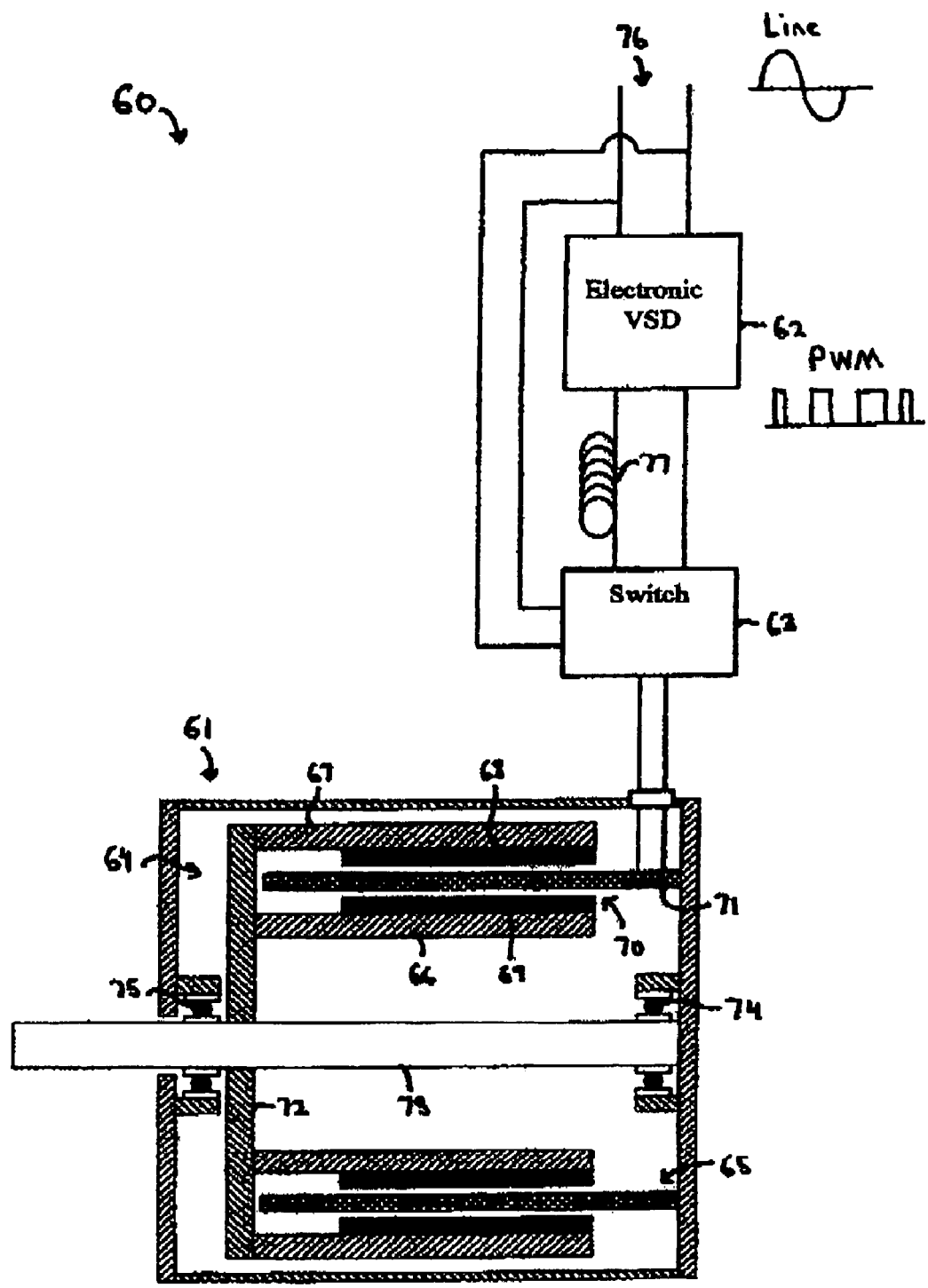
FIG. 5 is a sectional elevation and electrical schematic of a radial gap motor system in accordance with the invention.

A schematic drawing of a radial gap configuration motor system 60, shown in FIG. 5, includes an air core motor 61 having a rotor 64 and a stator 65. The rotor 64 is constructed from two nested, radially spaced steel cylinders 66, 67 that are attached to a hub 72 that connects to a center shaft 73 journaled for rotation by bearings 74, 75. Circumferential arrays of radial alternating polarity magnets 68, 69 are attached to the cylinders 66, 67 and drive magnetic flux across a magnetic airgap 70 that is formed between the cylinders 66, 67. Located in the magnetic airgap 70 is an air core armature 71 with windings that receive the flux. As shown, the motor system is operated from single-phase power 76 that is coupled to a VSD 62 that includes an integral detector or controller (hereinafter referred to generally as a "detector") for recognizing when the motor speed is approaching synchronous speed. The detector or controller could be separate from the VSD if convenient. The VSD 62 provides lower frequency drive power to the windings of the air core armature 71. An added inductor 77 minimizes ripple current during acceleration, however this can be omitted if the motor system is not utilized for long-term operation at low speeds below line synchronous.

During acceleration of the rotor 64, a switch 63 is triggered by the detector or controller when the frequency of the drive power from the VSD 62 approaches the frequency of the line power 76, and the switch 63 operates to couple line power 76 to the armature 71. In this motor system configuration, the switch 63 is located between the VSD 62 and the air core motor 61. The switch 63 can be located before or after the VSD, or alternatively two switches can be employed as well, so long as the switch reduces the losses of the motor system 60 and allows the operation of the air core armature form the line power 76 at line synchronous speed.

An additional desirable feature for operation of the motor system is in the design of a typical air core motor. Air core motors typically utilize a high pole number to reduce size weight and cost in their construction. Unfortunately, the high pole number would result in operating speeds that are too low to be useful in many applications when operated synchronously with line power. Preferably the air core motor is further specially designed with a low pole count, typical of induction motors. The air core motor should have a set number of poles, n, the line power has a frequency, f in Hz, and the motor has an operating rotational speed, R in rpm, such that: n=120 f/R.

Figure 6A:
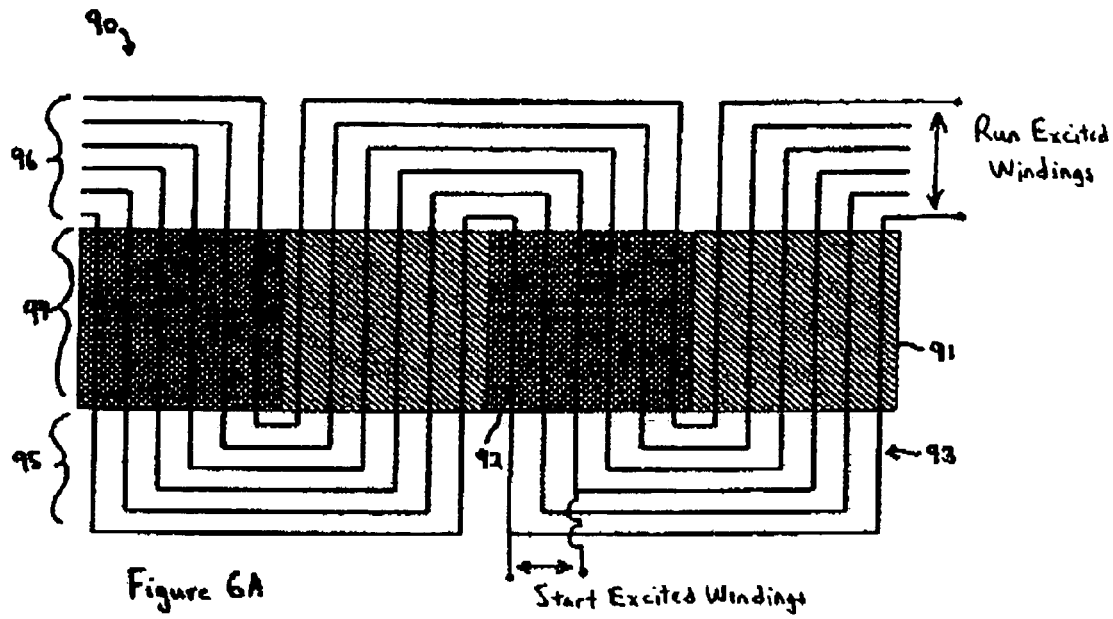
FIG. 6A is a developed schematic drawing of an air core armature winding for a motor system in accordance with the invention.
Figure 6B:
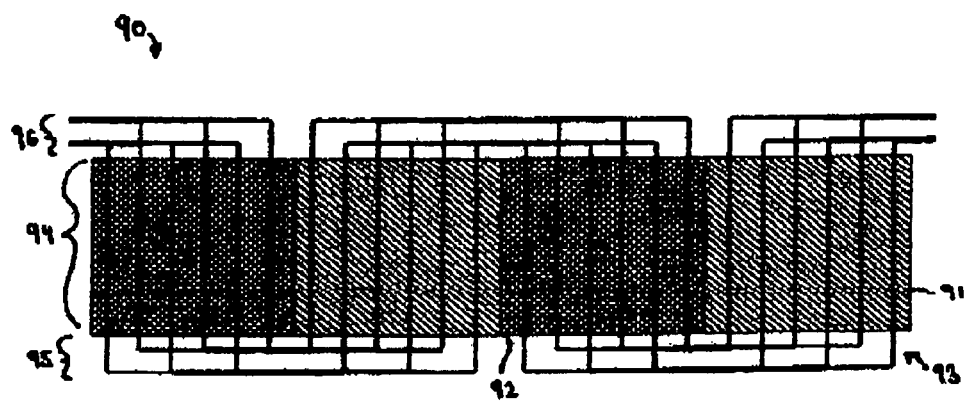
FIG. 6B is a developed schematic drawing of an alternate configuration air core armature winding for a motor system in accordance with the invention.

One of the drawbacks with employing a low pole count with air core motors is the incurring of higher losses, resulting from resistive losses from greater end turn lengths of the air core windings. Air core armatures for air core motors can be constructed with numerous methods, each having benefits and drawbacks in performance and manufacturing costs. Any type of air core armature that adequately provides the torque and set back emf and phase and pole numbers for successful operation of the motor system can be used. A schematic drawing of an air core armature winding for a motor system in accordance with the invention is shown in FIG. 6A. The armature 90 operates in a magnetic airgap adjacent to magnetic poles 91, 92. The armature 90 comprises a serpentine phase winding 93 that has both active lengths 94 and end turns 95, 96. The active lengths 94 are located in the magnetic flux from the poles 91, 92 and generate back emf as the rotor rotates. End turns 95, 96 circumferentially connect together successive active lengths 94. When the pole number of the air core motor is made small, such as under 10 poles, the circumferential length of the magnetic poles 91, 92 is increased. This undesirably increases the length of the end turns 95, 96, as they must extend out further. The increased end turn length increases the resistive losses in the air core motor and reduces the efficiency.

The amount of the reduction in efficiency from a low pole number in a particular air core motor may be acceptable for some cases. However, it has been found that the efficiency of the motor system can be maintained high despite the low pole number for line synchronous operation by modifying the windings construction. A schematic drawing of an alternate configuration air core armature winding for a motor system in accordance with the invention is shown in 6B. The armature 90' maintains a reduced end turn length despite having a low number of poles by utilizing end turn overlapping. The air core windings 93' of a single phase are wound having end turns 95', 96' of a single phase that overlap each other in the direction of the magnetic flux in the magnetic airgap. The end turn overlapping eliminates the need for the windings 93' to extend as far from the active lengths 94', thereby reducing the winding resistive losses and maintaining the desired high efficiency. Windings from multiple phases, such as in 3-phase motors, can likewise be assembled together in the same manner.

Figure 7:
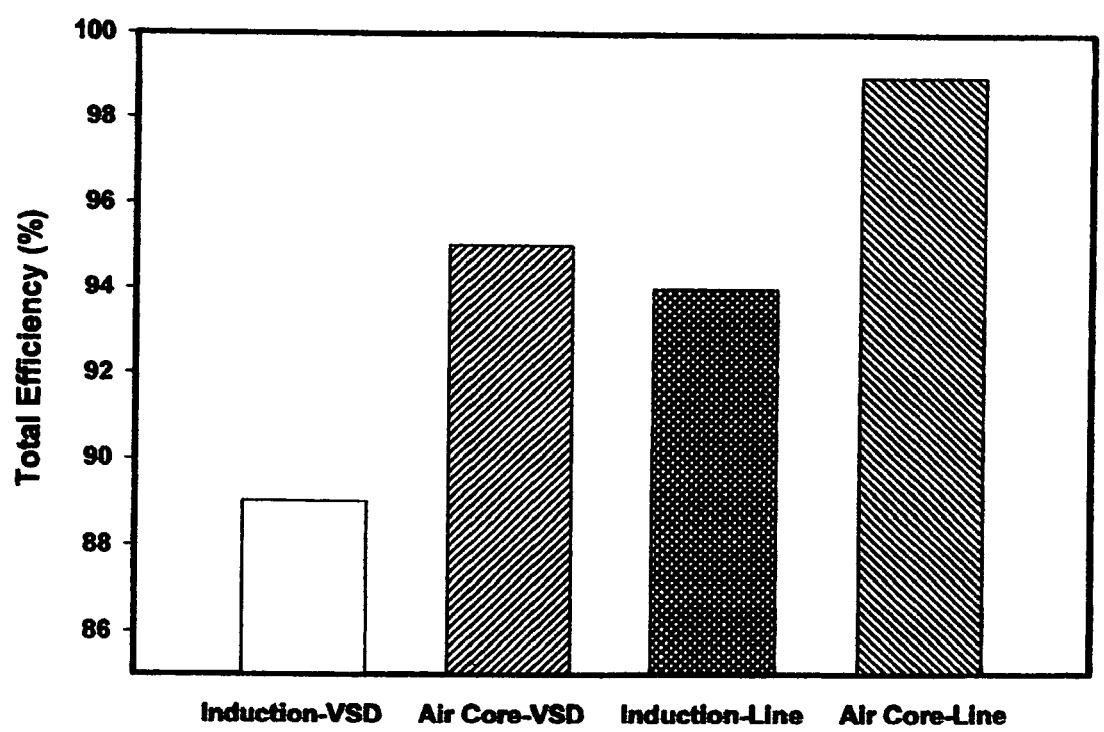
FIG. 7 is a bar graph comparing total efficiency between induction and air core motor systems.

A comparison of total efficiency between induction and air core motor systems is shown in FIG. 7. All motor systems are for a 40 Hp, 1200-rpm size. The efficiency for induction motors varies with size where smaller sizes and single-phase motors are considerably less efficient. Variable speed motor applications are shown on the left and fixed speed motor applications are shown on the right. For variable speed motor applications, both the induction motor and air core motor utilize a VSD, and hence both incur similar drive induced losses. The air core motor with VSD provides about 5% higher efficiency than the induction motor with VSD. However, in fixed speed applications, the air core motor with VSD provides only a modest efficiency increase, about 1%, over an induction motor operating directly from line power as shown. The new motor system overcomes this deficiency and provides higher efficiency with an air core motor for fixed speed applications. The air core motor powered from the line power, in accordance with the invention, provides an operating efficiency of about 99%. It does not incur the VSD or inductor losses when operating at the full fixed synchronous speed. The new motor system thereby affords a substantial energy cost savings over conventional induction motors even for use in fixed speed applications.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein I claim:

The invention claimed is:

1. A motor system for converting electrical energy from line power into rotational mechanical energy comprising:

an air core motor including a rotor with permanent magnet poles and a stationary armature with air core windings located within a magnetic airgap defined on one side by said permanent magnetic poles;

said permanent magnet poles are set to produce a level of magnetic flux density through said air core windings in said magnetic airgap such that a back emf is produced in said windings that is comparable to the voltage of said line power when the rotation of said permanent magnet poles across said air core windings is synchronous with said line power;

an electronic variable speed drive that couples to said windings and accelerates said rotor to near line synchronous speed by ramping up the frequency of power to said air core windings;

a detector that recognizes when said motor rotor approaches near line synchronous speed and produces a signal to indicate that said motor rotor has reached near line synchronous speed;

a switch responsive to said signal that couples said air core windings to said line power when the frequency of said back emf approaches the frequency of said line power.

2. A motor system as described in claim 1, wherein:
said magnetic airgap is bounded on both sides thereof by rotating surfaces of said rotor.

3. A motor system as described in claim 2, wherein:
both surfaces of said rotor facing said magnetic airgap have permanent magnets for driving magnetic flux across said magnetic airgap.

4. A motor system as described in claim 1, wherein:
both said line power and said air core windings have only a single phase.

5. A motor system as described in claim 1, wherein:
said line power is single phase and only a portion of said windings are excited during start up of said air core motor to set the rotational direction of said rotor.

6. A motor system as described in claim 1, wherein:
said acceleration power to said air core windings is regulated with pulse modulation switching prior to said air core windings being coupled to said line power.

7. A motor system as described in claim 1, wherein:
said air core windings are wound having end turns of a single phase that overlap each other in the direction of said magnetic flux in said magnetic airgap.

8. A motor system as described in claim 1, wherein:
said electronic variable speed drive ramps the acceleration power to said air core windings free of the use of multiple commutation sensors.

9. A motor system for converting electrical energy from line power into rotational mechanical energy comprising:
a permanent magnet motor having a rotor and a stator, said rotor having multiple poles and said stator comprising an armature with windings, wherein said poles of said rotor drive magnetic flux through said windings and generate a back emf in said windings as said rotor rotates;
a electronic variable speed drive that converts line power to a lower frequency drive power that is supplied to said windings, and said electronic variable speed drive ramps up the frequency of said drive power to accelerate said rotor;
a switch that couples said line power to said windings after said electronic variable speed drive accelerates said rotor.

10. A motor system as described in claim 9, wherein:
said windings are located within a magnetic airgap and said poles of said rotor drive magnetic flux through said magnetic airgap.

11. A motor system as described in claim 9, wherein:
both said line power and said air core windings have only a single phase.

12. A motor system as described in claim 9, wherein:
said line power is single phase and said permanent magnet motor excites only a portion of said windings during the start up of said air core motor to set the rotational direction of said rotor.

13. A motor system as described in claim 9, wherein:
said acceleration power to said air core windings is regulated with pulse modulation switching prior to said windings being coupled to said line power.

14. A motor system as described in claim 9, wherein:
said electronic variable speed drive ramps the acceleration power to said windings without the use of multiple commutation sensors.

15. A motor system for converting electrical energy from line power into rotational mechanical energy comprising:
an air core motor including a rotor having multiple poles, and a stator having a stationary armature with air core windings that are located within a magnetic airgap adjacent to said rotor such that said poles generate a back emf in said air core windings as said rotor rotates;
said air core motor further having a set number of poles, n, said line power has a frequency, f in Hz, and said motor has an operating rotational speed, R in rpm, such that:
n=120 f/R;
an electronic variable speed drive that provides acceleration power to said air core windings to accelerate said rotor; and
a switch that couples said line power to said air core windings when said rotor is accelerated to a speed near said operating rotational speed R.

16. A motor system as described in claim 15, wherein:
said magnetic airgap is bounded on both sides by rotating surfaces of said rotor.

17. A motor system as described in claim 15, wherein:
said line power is single phase and said electronic variable speed drive excites only a portion of said windings during the start up of said air core motor to set the rotational direction of said rotor.

18. A motor system as described in claim 15, wherein:
said acceleration power to said air core windings is regulated with pulse modulation switching prior to said air core windings being coupled to said line power.

19. A motor system as described in claim 15, wherein:
said air core windings are wound having end turns of a single phase that overlap each other in the direction of said magnetic flux in said magnetic airgap.

20. A motor system as described in claim 15, wherein:
said air core windings are wound with wire formed from multiple individually insulated conductors that are bunched together and electrically connected in parallel.

* * * * *